(12) United States Patent
Yoshida et al.

(10) Patent No.: US 10,890,109 B2
(45) Date of Patent: Jan. 12, 2021

(54) TURBOCHARGER

(71) Applicant: MITSUBISHI HEAVY INDUSTRIES ENGINE & TURBOCHARGER, LTD., Sagamihara (JP)

(72) Inventors: Toyotaka Yoshida, Tokyo (JP); Yosuke Dammoto, Tokyo (JP); Yoji Akiyama, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 131 days.

(21) Appl. No.: 16/081,233

(22) PCT Filed: Mar. 30, 2016

(86) PCT No.: PCT/JP2016/060374
§ 371 (c)(1),
(2) Date: Aug. 30, 2018

(87) PCT Pub. No.: WO2017/168629
PCT Pub. Date: Oct. 5, 2017

(65) Prior Publication Data
US 2019/0078508 A1  Mar. 14, 2019

(51) Int. Cl.
*F02B 37/24* (2006.01)
*F01D 9/02* (2006.01)
(Continued)

(52) U.S. Cl.
CPC .............. *F02B 37/24* (2013.01); *F01D 9/026* (2013.01); *F01D 17/165* (2013.01); *F02B 39/00* (2013.01);
(Continued)

(58) Field of Classification Search
CPC .......... F02B 39/00; F02B 37/22; F02B 37/24; F01D 17/165; F01D 9/026; F05D 2240/028; F05D 2220/40
(Continued)

(56) References Cited

U.S. PATENT DOCUMENTS

2006/0133931 A1  6/2006  Burmester et al.
2006/0188368 A1  8/2006  Jinnai et al.
(Continued)

FOREIGN PATENT DOCUMENTS

CN  103261622 A  8/2013
CN  105392975 A  3/2016
(Continued)

OTHER PUBLICATIONS

Written Opinion of the International Searching Authority and International Search Report (forms PCT/ISA/237 and PCT/ISA/210), dated Jun. 28, 2016, for International Application No. PCT/JP2016/060374, with English translations.

*Primary Examiner* — Mark A Laurenzi
*Assistant Examiner* — Mickey H France
(74) *Attorney, Agent, or Firm* — Birch, Stewart, Kolasch & Birch, LLP

(57) ABSTRACT

This turbocharger (10) comprises a turbine wheel (12), a compressor wheel (13), and a scroll flowpath (34) formed in a turbine housing (31), continuing in the circumferential direction on the radially outer side of the turbine wheel (12), and having gas flowing therethrough that rotates and drives the turbine wheel (12). The scroll flowpath (34) is formed such that: an inner circumferential inside wall surface (34*c*) on the turbine wheel (12) side is gradually displaced radially outwards, along the direction of gas flow; and the cross-sectional area of the flowpath gradually decreases.

8 Claims, 6 Drawing Sheets

(51) Int. Cl.
*F01D 17/16* (2006.01)
*F02B 39/00* (2006.01)
*F02C 6/12* (2006.01)

(52) U.S. Cl.
CPC ............ *F02C 6/12* (2013.01); *F05D 2220/40* (2013.01); *F05D 2240/128* (2013.01)

(58) Field of Classification Search
USPC .................................................. 60/598, 602
See application file for complete search history.

(56) References Cited

U.S. PATENT DOCUMENTS

| | | |
|---|---|---|
| 2013/0266433 A1 | 10/2013 | Yokoyama et al. |
| 2014/0212277 A1 | 7/2014 | Uesugi |
| 2014/0248137 A1* | 9/2014 | Inoue ...................... F01D 17/16 415/159 |
| 2016/0245160 A1 | 8/2016 | Ueda et al. |
| 2018/0252160 A1* | 9/2018 | Hoecker ................. F01D 17/14 |

FOREIGN PATENT DOCUMENTS

| | | | |
|---|---|---|---|
| DE | 102015216507.8 | * 8/2015 | ............. F01D 17/16 |
| EP | 2 730 750 A2 | 5/2014 | |
| JP | 62-29724 A | 2/1987 | |
| JP | 2-12004 U | 1/1990 | |
| JP | 11-229886 A | 8/1999 | |
| JP | 4275081 B2 | 6/2009 | |
| JP | 2010-1863 A | 1/2010 | |
| JP | 2010-209824 A | 9/2010 | |
| JP | 2014-145300 A | 8/2014 | |
| JP | 2015-63945 A | 4/2015 | |
| JP | 2015-140740 A | 8/2015 | |
| WO | WO 2004/109062 A1 | 12/2004 | |
| WO | WO 2015/002228 A1 | 1/2015 | |
| WO | WO 2015/044742 A1 | 4/2015 | |

* cited by examiner

TURBOCHARGER

TECHNICAL FIELD

The present invention relates to a turbocharger.

BACKGROUND ART

A variable capacity-type turbocharger is known as a turbocharger in which the flow rate of gas supplied to a turbine wheel is made variable through a change in the opening area of a nozzle flowpath for flow into the turbine wheel from the radially outer side of the turbine wheel.

For example, PTL 1 discloses a configuration for enhancing efficiency by increasing the cross-sectional area of a scroll flowpath disposed on the radially outer side of a turbine wheel and supplying exhaust gas to the turbine wheel. In this configuration regarding a variable capacity-type turbocharger, a part of an inner circumferential side wall surface of a scroll is formed such that a nozzle plate of a variable nozzle mechanism faces the scroll flowpath, and thus a part of a turbine casing becomes unnecessary and the cross-sectional area of the scroll flowpath is ensured.

CITATION LIST

Patent Literature

[PTL 1] Japanese Patent No. 4275081

SUMMARY OF INVENTION

Technical Problem

In general, a scroll flowpath in a turbocharger such as the turbocharger disclosed in PTL 1 has a size allowing exhaust gas to flow without restriction after moving in at a maximum flow rate. However, in the case of a large scroll flowpath, an increase in the surface area of an inside wall surface results in an increase in heat dissipation. In the case of exhaust gas with a small flow rate, in particular, the amount of heat loss-based efficiency reduction becomes relatively large once the exhaust gas is deprived of heat.

An object of the present invention is to provide a turbocharger with which turbocharging efficiency can be enhanced by exhaust gas heat dissipation being suppressed.

Solution to Problem

According to a first aspect of the present invention, a turbocharger includes a rotating shaft extending along an axis, a turbine wheel disposed on a first end portion side of the rotating shaft, and a compressor wheel disposed on a second end portion side of the rotating shaft. The turbocharger further includes a turbine housing accommodating the turbine wheel, and a scroll flowpath formed in the turbine housing, continuing in a circumferential direction on a radially outer side of the turbine wheel, and guiding gas to the turbine wheel. The scroll flowpath is formed such that an inner circumferential inside wall surface on a side close to the turbine wheel is gradually displaced radially outwards downstream in the circumferential direction in which the gas flows and the cross-sectional area of the flowpath gradually decreases.

In general, a scroll flowpath of a turbine of a turbocharger is formed in a scroll shape with the cross-sectional center of the flowpath and an inner circumferential inside wall surface on a turbine wheel side approaching each other radially inwards toward the downstream side in a gas flow direction. Furthermore, the gas that flows through the scroll flowpath is a free vortex. Accordingly, the flow speed of gas entering the scroll flowpath from a radial position outside increases radially inwards.

In contrast, according to the above-described configuration, the cross-sectional centers of the flowpath are positioned apart radially outwards with respect to the axis as the scroll flowpath heads to the downstream side of the gas flow direction. Accordingly, the flow speed of the gas that flows through the scroll flowpath can be reduced. By the flow speed of the gas being reduced, the Reynolds number can be reduced and a heat transfer coefficient can be reduced. Accordingly, gas heat dissipation can be suppressed and turbocharging efficiency can be enhanced.

According to a second aspect of the present invention, the turbocharger in the first aspect may include a nozzle flowpath guiding the gas radially inwards from the scroll flowpath and supplying the gas to the turbine wheel. The turbocharger may further include a vane disposed in the nozzle flowpath and adjusting an amount of the gas introduced in the nozzle flowpath. The scroll flowpath may be formed such that an offset dimension of a cross-sectional center position of the scroll flowpath with respect to a radially outer position of the nozzle flowpath in a direction along the axis gradually decreases as the cross-sectional area of the flowpath gradually decreases toward the downstream side of the gas flow direction.

As a result, the scroll flowpath has a cross-sectional area decreasing toward the downstream side in the gas flow direction and the offset dimension of the scroll flowpath with respect to the nozzle flowpath in the axial direction decreases, and thus the gas directly flows radially inwards from the scroll flowpath toward the nozzle flowpath. As a result, the area of contact between the gas that flows from the scroll flowpath toward the nozzle flowpath and a member around the nozzle flowpath can be reduced, and thus the amount of heat dissipation can be reduced.

According to a third aspect of the present invention, in the turbocharger in the second aspect, the scroll flowpath may be formed such that an outer circumferential wall surface on the radially outer side along the flow direction of the gas has a constant radial position with respect to the axis.

As a result, an increase in the size of the turbocharger can be suppressed, the amount of heat dissipation from the scroll flowpath can be reduced, and turbocharging efficiency can be enhanced.

According to a fourth aspect of the present invention, the turbocharger in the second or third aspect further includes a bearing housing rotatably supporting the rotating shaft and a nozzle mount disposed on a bearing housing side with respect to the nozzle flowpath and sandwiched and held between the bearing housing and a mount fixing portion formed in the turbine housing. The turbine housing may include a cover portion extending from the mount fixing portion toward the nozzle flowpath and covering at least a part of the nozzle mount.

According to this configuration, the cover portion disposed in the turbine housing covers at least a part of the nozzle mount, and thus escaping of the thermal energy of the gas that flows through the scroll flowpath to the bearing housing side via the nozzle mount can be suppressed.

According to a fifth aspect of the present invention, in the turbocharger in the fourth aspect, a gap may be formed between the cover portion and the nozzle mount.

According to this configuration, escaping of the thermal energy of the gas that flows through the scroll flowpath to the bearing housing side via the nozzle mount can be more reliably suppressed by the gap between the cover portion and the nozzle mount.

According to a sixth aspect of the present invention, the turbocharger in the first aspect may further include an exhaust section formed in the turbine housing for the gas sent out by the turbine wheel and a heat insulating portion suppressing heat escape from the scroll flowpath to the exhaust section.

As a result, escaping of the thermal energy of exhaust gas from the scroll flowpath to the exhaust section without passing through the turbine wheel can be suppressed by the heat insulating portion.

According to a seventh aspect of the present invention, in the turbocharger in the sixth aspect, the heat insulating portion may include a gap formed in a shroud portion partitioning the scroll flowpath and the exhaust section from each other in the turbine housing.

As a result, escaping of the thermal energy of exhaust gas from the scroll flowpath to the exhaust section can be suppressed by the heat insulating portion including the gap (air) lower in thermal conductivity than that of the material that forms the shroud portion.

According to an eighth aspect of the present invention, in the turbocharger in the seventh aspect, the gap may be filled with a heat insulating material.

Escaping of the thermal energy of exhaust gas can be more reliably suppressed by the gap being filled with the heat insulating material as described above.

According to a ninth aspect of the present invention, the turbocharger in the sixth aspect may include a bearing housing rotatably supporting the rotating shaft and a nozzle flowpath guiding the gas radially inwards from the scroll flowpath and supplying the gas to the turbine wheel. The turbocharger may further include a vane disposed in the nozzle flowpath and adjusting the amount of the gas introduced in the nozzle flowpath and a nozzle plate disposed on a side opposite to the bearing housing with respect to the nozzle flowpath. The heat insulating portion may include a heat insulating material sandwiched between the nozzle plate and a shroud portion partitioning the exhaust section and the scroll flowpath from each other in the turbine housing.

As a result, the heat that is transferred to the nozzle plate from the shroud portion facing the scroll flowpath can be reduced, and heat dissipation in the scroll flowpath can be suppressed.

According to a tenth aspect of the present invention, the turbocharger in the sixth aspect may include a bearing housing rotatably supporting the rotating shaft and a nozzle flowpath guiding the gas radially inwards from the scroll flowpath and supplying the gas to the turbine wheel. The turbocharger may further include a vane disposed in the nozzle flowpath and adjusting the amount of the gas introduced in the nozzle flowpath and a nozzle plate disposed on a side opposite to the bearing housing with respect to the nozzle flowpath. The heat insulating portion may include a coating layer formed on a surface of the nozzle plate and including a heat insulating material.

As a result, the heat that is transferred to the nozzle plate from the shroud portion facing the scroll flowpath can be reduced, and heat dissipation in the scroll flowpath can be suppressed.

According to an eleventh aspect of the present invention, a turbocharger includes a rotating shaft extending along an axis, a turbine wheel disposed on a first end portion side of the rotating shaft, and a compressor wheel disposed on a second end portion side of the rotating shaft. The turbocharger further includes a bearing housing rotatably supporting the rotating shaft and a turbine housing accommodating the turbine wheel. The turbocharger further includes a scroll flowpath formed in the turbine housing, continuing in the circumferential direction on the radially outer side of the turbine wheel, and having gas flowing therethrough that rotates and drives the turbine wheel. The turbocharger further includes a nozzle flowpath guiding the gas radially inwards from the scroll flowpath and supplying the gas to the turbine wheel. The turbocharger further includes a nozzle mount disposed on the bearing housing side with respect to the nozzle flowpath and sandwiched and held between the bearing housing and a mount fixing portion formed in the turbine housing. A cover portion extending from the mount fixing portion toward the nozzle flowpath and covering at least a part of the nozzle mount is disposed in the turbine housing.

According to this configuration, the cover portion disposed in the turbine housing covers at least a part of the nozzle mount, and thus escaping of the thermal energy of the gas that flows through the scroll flowpath to the bearing housing side via the nozzle mount can be suppressed.

According to a twelfth aspect of the present invention, a turbocharger includes a rotating shaft extending along an axis, a turbine wheel disposed on a first end portion side of the rotating shaft, and a compressor wheel disposed on a second end portion side of the rotating shaft. The turbocharger further includes a bearing housing rotatably supporting the rotating shaft and a turbine housing accommodating the turbine wheel. The turbocharger further includes a scroll flowpath formed in the turbine housing, continuing in the circumferential direction on the radially outer side of the turbine wheel, and having gas flowing therethrough that rotates and drives the turbine wheel. The turbocharger further includes an exhaust section formed in the turbine housing for the gas sent out by the turbine wheel. The turbocharger further includes a heat insulating portion suppressing heat escape from the scroll flowpath to the exhaust section.

As a result, escaping of the thermal energy of exhaust gas from the scroll flowpath to the exhaust section without passing through the turbine wheel can be suppressed by the heat insulating portion.

According to a thirteenth aspect of the present invention, in the turbocharger in the twelfth aspect, the heat insulating portion may include a gap formed in a shroud portion partitioning the scroll flowpath and the exhaust section from each other in the turbine housing.

As a result, escaping of the thermal energy of exhaust gas can be more reliably suppressed by the gap being formed in the shroud portion.

Advantageous Effects of Invention

With the turbocharger described above, turbocharging efficiency can be enhanced by exhaust gas heat dissipation being suppressed.

DESCRIPTION OF EMBODIMENTS

Figure 1:
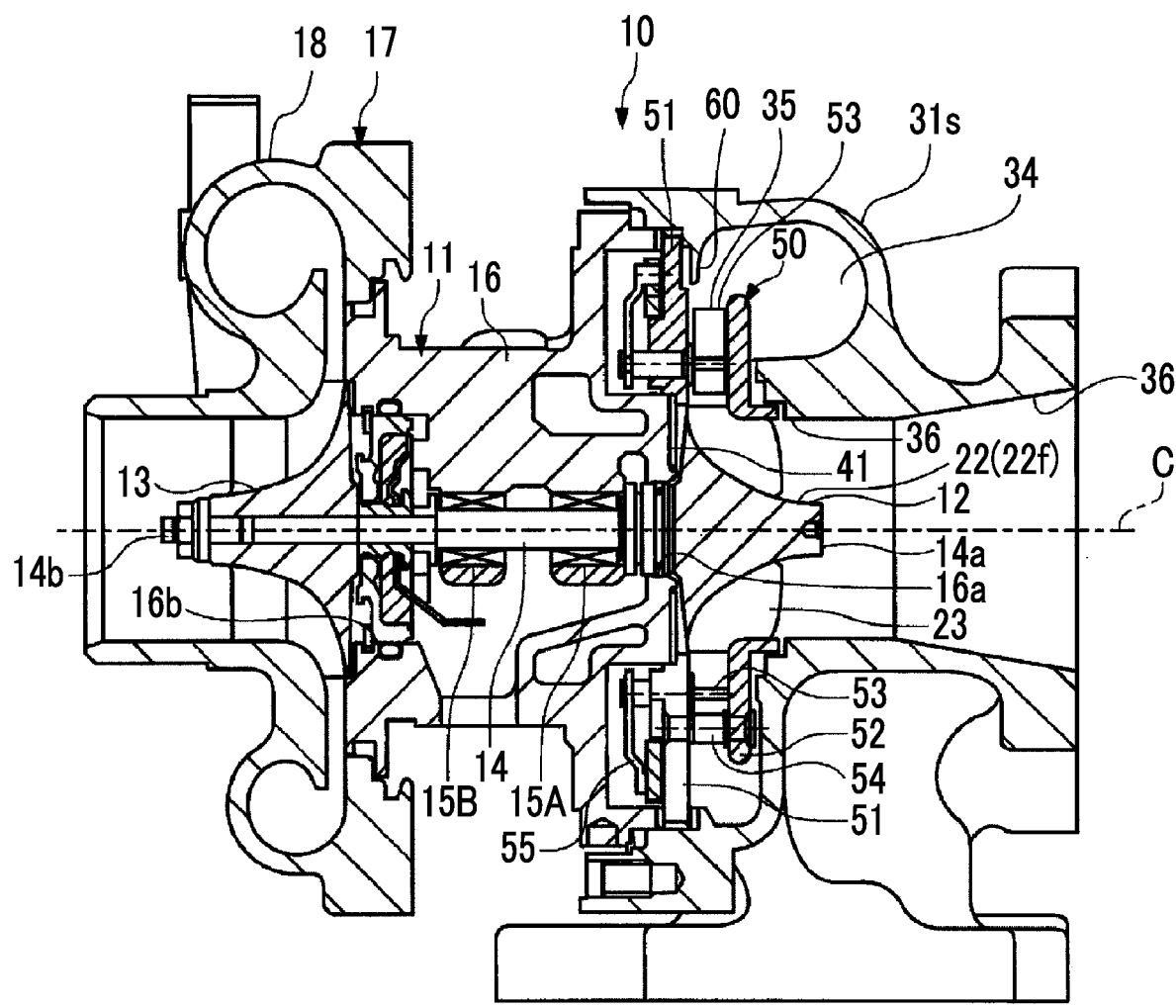
FIG. 1 is a cross-sectional view illustrating an overall configuration of a turbocharger according to an embodiment of the present invention.

FIG. 1 is a cross-sectional view illustrating an overall configuration of a turbocharger according to an embodiment of the present invention.

As illustrated in FIG. 1, a turbocharger 10 according to the present embodiment is provided with a turbocharger body 11, a compressor 17, and a turbine 30. The turbocharger 10 is, for example, mounted as an auxiliary machine for an engine in an automobile or the like with a posture in which a rotating shaft 14 extends in the horizontal direction.

The turbocharger body 11 is provided with the rotating shaft 14, bearings 15A and 15B, and a bearing housing 16.

The bearing housing 16 is supported by a car body or the like via, for example, a bracket (not illustrated), the compressor 17, and the turbine 30. The bearing housing 16 has an opening 16a on one end side thereof and has an opening 16b on the other end side thereof.

The bearings 15A and 15B are disposed in the bearing housing 16. The bearings 15A and 15B support the rotating shaft 14 such that the rotating shaft 14 is rotatable around a central axis C.

A first end portion 14a and a second end portion 14b of the rotating shaft 14 protrude to the outside of the bearing housing 16 through the openings 16a and 16b.

The compressor 17 is disposed on the other end side of the bearing housing 16. The compressor 17 is provided with a compressor wheel 13 and a compressor housing 18.

The compressor wheel 13 is disposed in the second end portion 14b of the rotating shaft 14 outside the bearing housing 16. The compressor wheel 13 rotates around the central axis C together with the rotating shaft 14.

The compressor housing 18 is connected to the other end side of the bearing housing 16. The compressor housing 18 accommodates the compressor wheel 13 therein.

The turbine 30 is disposed on one end side of the bearing housing 16. The turbine 30 is provided with a turbine housing 31 and a turbine wheel 12.

Figure 2:
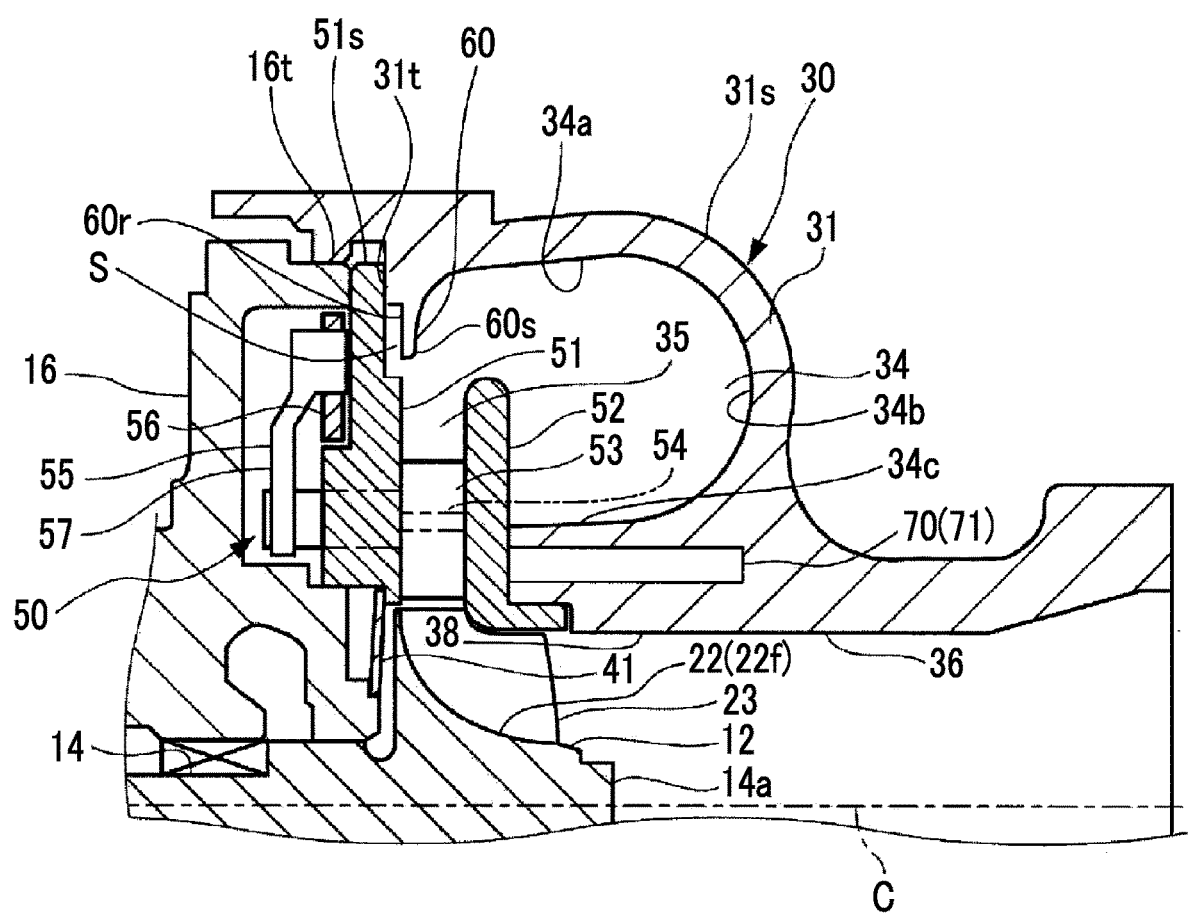
FIG. 2 is a cross-sectional view illustrating a configuration around a turbine wheel constituting the turbocharger.
Figure 3:
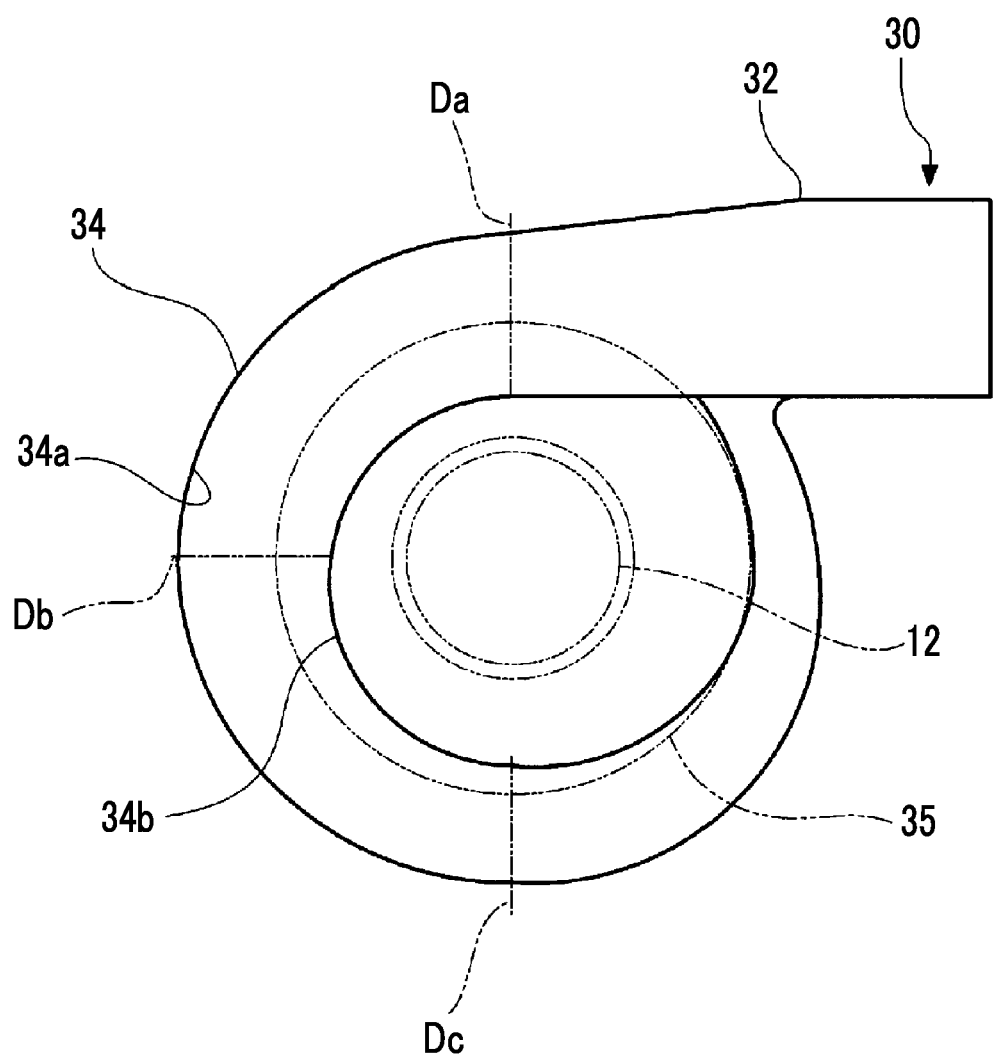
FIG. 3 is a diagram illustrating a schematic shape of a scroll flowpath constituting a turbine of the turbocharger.

FIG. 2 is a cross-sectional view illustrating a configuration around the turbine wheel constituting the turbocharger. FIG. 3 is a diagram illustrating a schematic shape of a scroll flowpath constituting the turbine.

As illustrated in FIG. 2, the turbine housing 31 is connected to one end side of the bearing housing 16. The turbine housing 31 accommodates the turbine wheel 12 therein.

The turbine housing 31 is provided with a gas introduction section 32 (refer to FIG. 3), a scroll flowpath 34, a nozzle flowpath 35, and an exhaust section 36.

As illustrated in FIG. 3, the gas introduction section 32 sends exhaust gas discharged from the engine (not illustrated) into the scroll flowpath 34.

The scroll flowpath 34, which leads to the gas introduction section 32, is formed continuously in the circumferential direction on the radially outer side of the turbine wheel 12. The scroll flowpath 34 forms a flowpath through which exhaust gas rotating and driving the turbine wheel 12 flows in the circumferential direction.

As illustrated in FIG. 2, the nozzle flowpath 35 is formed on the side of the turbine housing 31 that faces the bearing housing 16. The nozzle flowpath 35 is formed such that the scroll flowpath 34 and the turbine wheel 12 communicate with each other in the radial direction over the entire circumference in the circumferential direction.

Exhaust gas discharged from the turbine wheel 12 flows through the exhaust section 36. The exhaust section 36 is continuously formed in a direction away from the turbocharger body 11 along the central axis C direction of the rotating shaft 14 from an outer circumferential portion of the turbine wheel 12.

The turbine wheel 12 is disposed integrally with the first end portion 14a of the rotating shaft 14. The turbine wheel 12 rotates around the central axis C together with the rotating shaft 14.

The turbine wheel 12 is provided with a disk 22 and a blade 23.

The disk 22 has a certain length in the central axis C direction and is fixed to the first end portion 14a of the rotating shaft 14. The disk 22 has a disk shape extending radially outwards and has a disk surface 22f on one side in the central axis C direction. The disk surface 22f is formed by a curved surface gradually heading to the bearing housing 16 side on the other side in the central axis C direction from the exhaust section 36 (refer to FIG. 2) side on one side in the central axis C direction as the disk surface 22f heads radially outwards.

On the disk surface 22f, a plurality of the blades 23 are disposed at intervals in the circumferential direction around the central axis C.

In the turbine 30, exhaust gas flowing in from the gas introduction section 32 flows in the circumferential direction through the outer circumferential side of the turbine wheel 12 along the scroll flowpath 34. The exhaust gas flowing in the circumferential direction as described above flows radially inwards through the nozzle flowpath 35 and hits the blade 23 of the turbine wheel 12. As a result, the turbine wheel 12 is rotated and driven. The exhaust gas passing through the turbine wheel 12 is discharged into the exhaust section 36 from the inner circumferential side of the turbine wheel 12.

The nozzle flowpath 35 is provided with a variable vane mechanism 50 adjusting the amount of exhaust gas supplied from the scroll flowpath 34 to the turbine wheel 12 through the nozzle flowpath 35.

The variable vane mechanism 50 is provided with a nozzle mount 51, a nozzle plate 52, a vane 53, and a drive unit 55.

The nozzle mount 51 is disposed on the bearing housing 16 side of the nozzle flowpath 35 and formed in an annular plate shape positioned in a plane orthogonal to the central axis C.

The nozzle plate 52 is apart from the nozzle mount 51 on the side of the nozzle flowpath 35 that is opposite to the nozzle mount 51. The nozzle flowpath 35 is between the nozzle mount 51 and the nozzle plate 52.

A back plate 41 blocking the outer circumferential portion gap of the first end portion 14a of the rotating shaft 14 is disposed on the radially inner side of the nozzle mount 51.

The vane 53 has a plate shape and is disposed between the nozzle mount 51 and the nozzle plate 52. A plurality of the vanes 53 are disposed at intervals in the circumferential direction in the nozzle flowpath 35 continuing in the circumferential direction. Each vane 53 is rotatably supported around the central axis of a shaft 54 by the shaft 54 penetrating the nozzle mount 51 in the central axis C direction.

The drive unit 55 adjusts the angle of the vane 53 by rotating the shaft 54 protruding from the nozzle mount 51 to the bearing housing 16 side. The drive unit 55 is disposed on the bearing housing 16 side with respect to the nozzle mount 51. The drive unit 55 is provided with a drive ring 56 and a link arm 57.

The drive ring 56 has an annular shape and is disposed closer to the outer circumferential side in the radial direction than the shaft 54. The drive ring 56 is disposed to be orbitable in the circumferential direction thereof by an actuator (not illustrated) or the like.

The link arms 57 are respectively connected to the shafts 54. One end of each link arm 57 is connected to the shaft 54 and the other end of each link arm 57 is rotatably connected to the drive ring 56. As a result of rotation of the drive ring 56, the link arm 57 rotates around the shaft 54. As a result, the angle of the vanes 53 disposed in the circumferential direction changes around the central axis of the shaft 54.

Once the angle of the vanes 53 changes, the gap between the vanes 53 next to each other in the circumferential direction increases and decreases. As a result, the amount of exhaust gas sent (introduced) into the turbine wheel 12 through the nozzle flowpath 35 is adjusted.

In the present embodiment, the scroll flowpath 34 is formed in a scroll forming portion 31s (refer to FIG. 2) expanded toward the radially outer side of the turbine housing 31. As illustrated in FIG. 3, the scroll forming portion 31s is formed continuously in the circumferential direction of the turbine housing 31 and the scroll flowpath 34 is formed therein. The scroll flowpath 34 is formed such that the inner diameter thereof gradually decreases as the scroll flowpath 34 is away from the gas introduction section 32 along the flowpath axial direction continuing in the circumferential direction of the turbine housing 31.

Figure 4:
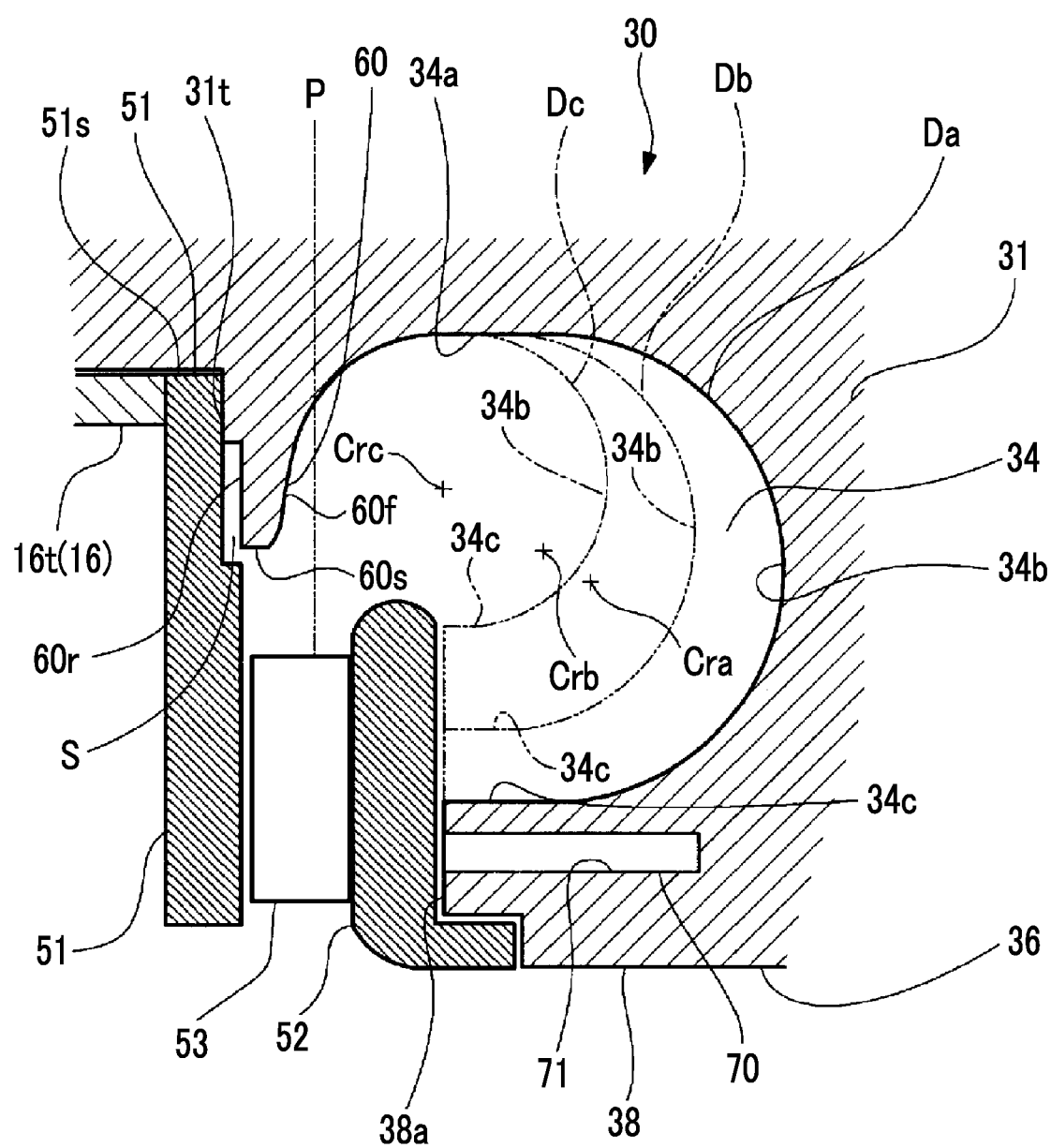
FIG. 4 is a cross-sectional view illustrating the shape of the scroll flowpath at each of the positions of cross sections Da, Db, and Dc in FIG. 3.

FIG. 4 is a cross-sectional view illustrating the shape of the scroll flowpath at each of the positions of cross sections Da, Db, and Dc in FIG. 3.

As illustrated in FIG. 4, the scroll flowpath 34 has an outer circumferential inside wall surface 34a almost parallel to the central axis C (refer to FIG. 2), a curved inside wall surface 34b formed on the side opposite to the bearing housing 16 with respect to the nozzle plate 52 and curved in a semicircular concave shape, and an inner circumferential inside wall surface 34c leading to the radially inner end portion of the curved inside wall surface 34b.

As illustrated in FIGS. 3 and 4, the scroll flowpath 34 is formed such that the outer circumferential inside wall surface 34a on the radially outer side extending in a gas flow direction has a constant radial position with respect to the central axis C. In contrast, the scroll flowpath 34 is formed displaced in position along the gas flow direction such that the inner circumferential inside wall surface 34c is positioned radially outwards in a gradual manner as the scroll flowpath 34 is away from the gas introduction section 32. As a result, the scroll flowpath 34 is formed such that the distance between the outer circumferential inside wall surface 34a and the inner circumferential inside wall surface 34c in the radial direction, that is, the curvature radius of the curved inside wall surface 34b gradually decreases.

Then, for example, the positions of a cross-sectional center Cra of the cross section Da of the scroll flowpath 34, a cross-sectional center Crb of the cross section Db of the scroll flowpath 34, and a cross-sectional center Crc of the cross section Dc of the scroll flowpath 34 are displaced radially outwards away from the gas introduction section 32 in comparison among the three cross sections Da, Db, and Dc from the upstream side toward the downstream side of the scroll flowpath 34. In addition, the positions of the cross-sectional centers Cra, Crb, and Crc of the scroll flowpath 34 are displaced to the bearing housing 16 side in the central axis C direction toward the downstream side of the gas flow direction. In other words, the positions of the cross-sectional centers Cra, Crb, and Crc of the scroll flowpath 34 are displaced such that the amount of offset from a position P on the radially outer side of the nozzle flowpath 35 in the central axis C direction decreases toward the downstream side of the gas flow direction. As a result, the scroll flowpath 34 is positioned radially outwards with respect to the nozzle flowpath 35 as the scroll flowpath 34 heads to the downstream side of the gas flow direction, and the flow of exhaust gas with respect to the nozzle flowpath 35 becomes smooth from the scroll flowpath 34.

The nozzle mount 51 has an outer circumferential end portion 51s sandwiched between a fixed portion 16t formed in the outer circumferential portion of the bearing housing 16 and a mount fixing portion 31t formed in the outer circumferential portion of the turbine housing 31. The turbine housing 31 is provided with a cover portion 60 extending radially inwards from the mount fixing portion 31t. A scroll side surface 60f of the cover portion 60, which faces the scroll flowpath 34, leads to the outer circumferential inside wall surface 34a of the scroll flowpath 34 and is formed by a curved surface gradually heading radially inwards.

The cover portion 60 has a tip portion 60s on the radially inner side and the tip portion 60s is set at a position not interfering with the vane 53.

A gap S is formed between the nozzle mount 51 and a back surface 60r of the cover portion 60 on the nozzle mount 51 side. This gap S can be ensured by, for example, the nozzle mount 51 facing the cover portion 60 and a recessed portion 62 being formed.

A heat insulating portion 70 suppressing heat escape through a shroud portion 38 from the scroll flowpath 34 is formed in the shroud portion 38 of the turbine housing 31 that partitions the scroll flowpath 34 and the exhaust section 36 from each other. The shroud portion 38 forms the exhaust section 36 and the inner circumferential inside wall surface 34c of the scroll flowpath 34 and is positioned such that an end portion 38a thereof faces the nozzle plate 52.

In the present embodiment, the heat insulating portion 70 is formed by a gap 71 being formed in the shroud portion 38 between the exhaust section 36 and the inner circumferential inside wall surface 34c of the scroll flowpath 34. The gap 71 that forms the heat insulating portion 70 is formed in a slit shape extending in a direction away from the nozzle plate 52 from the side of the end portion 38a of the shroud portion 38 that faces the nozzle plate 52. The heat insulating portion 70 is formed in an annular shape around the central axis C.

The gap 71 may be filled with a heat insulating material or the like. The heat insulating material that is used here is formed of a material lower in thermal conductivity than the turbine housing 31. Specifically, the heat insulating material that is used here can be formed of, for example, a heat insulating material or a heat shielding material that has a thermal conductivity of 0.1 W/m/K or less at a normal temperature. Usable as a material of this type is, for example, a sheet material or a porous body formed of a ceramic material, a silica-based material, or the like. Furthermore, the heat insulating material may be formed by that type of material being covered with a metallic net.

In the turbocharger 10 according to the above-described embodiment, the cross-sectional centers Cra to Crc of the scroll flowpath 34 are positioned apart radially outwards as the scroll flowpath 34 heads to the downstream side of the gas flow direction. Then, the distance from the scroll flowpath 34 to the turbine wheel 12 in the radial direction increases toward the downstream side of the gas flow direction. In this manner, the flow speed of gas becoming a free vortex can be reduced as the scroll flowpath 34 is positioned away radially outwards. As a result, the Reynolds number of the gas that flows through the scroll flowpath 34 can be reduced. Accordingly, the heat transfer coefficient to the scroll forming portion 31s can be reduced and the amount of gas heat dissipation can be reduced. As a result, gas heat dissipation can be suppressed and turbocharging efficiency can be enhanced.

In addition, the scroll flowpath 34 has a cross-sectional area decreasing toward the downstream side in the gas flow direction and the offset dimension of the scroll flowpath 34 with respect to the nozzle flowpath 35 in the central axis C direction decreases, and thus the gas directly flows radially inwards from the scroll flowpath 34 toward the nozzle flowpath 35. As a result, the area of contact between the gas that flows from the scroll flowpath 34 toward the nozzle flowpath 35 and a member around the nozzle flowpath 35 such as the nozzle plate 52 can be reduced, and thus the amount of heat dissipation can be reduced.

Furthermore, the scroll flowpath 34 is formed such that the outer circumferential inside wall surface 34a on the radially outer side has a constant radial position with respect to the central axis C in the gas flow direction. As a result, an increase in the size of the turbocharger 10 can be suppressed, the amount of heat dissipation from the scroll flowpath 34 can be reduced, and turbocharging efficiency can be enhanced.

In addition, the cover portion 60 disposed in the turbine housing 31 covers at least a part of the nozzle mount 51, and thus escaping of the thermal energy of the gas that flows through the scroll flowpath 34 to the bearing housing 16 side via the nozzle mount 51 can be suppressed.

Furthermore, the gap S is formed between the cover portion 60 and the nozzle mount 51, and thus escaping of the thermal energy of the gas that flows through the scroll flowpath 34 to the bearing housing 16 side via the nozzle mount 51 can be more reliably suppressed.

Furthermore, the turbocharger 10 is provided with the heat insulating portion 70 suppressing heat escape from the scroll flowpath 34 to the exhaust section 36. The thermal energy of exhaust gas escaping from the scroll flowpath 34 to the exhaust section 36 side without passing through the turbine wheel 12 can be suppressed by the heat insulating portion 70.

Here, the heat insulating portion 70 includes the gap 71 formed in the shroud portion 38 partitioning the scroll flowpath 34 and the exhaust section 36 from each other in the turbine housing 31. As a result, escaping of the thermal energy of exhaust gas from the scroll flowpath 34 to the exhaust section 36 side can be suppressed by the heat insulating portion 70 including the gap 71 (air) lower in thermal conductivity than the material that forms the shroud portion 38.

Furthermore, escaping of the thermal energy of exhaust gas can be more reliably suppressed when the gap 71 is filled with the heat insulating material.

Modification Examples of Embodiment

Although the gap 71 is formed as the heat insulating portion 70 in the above-described embodiment, the present invention is not limited thereto.

Figure 5:
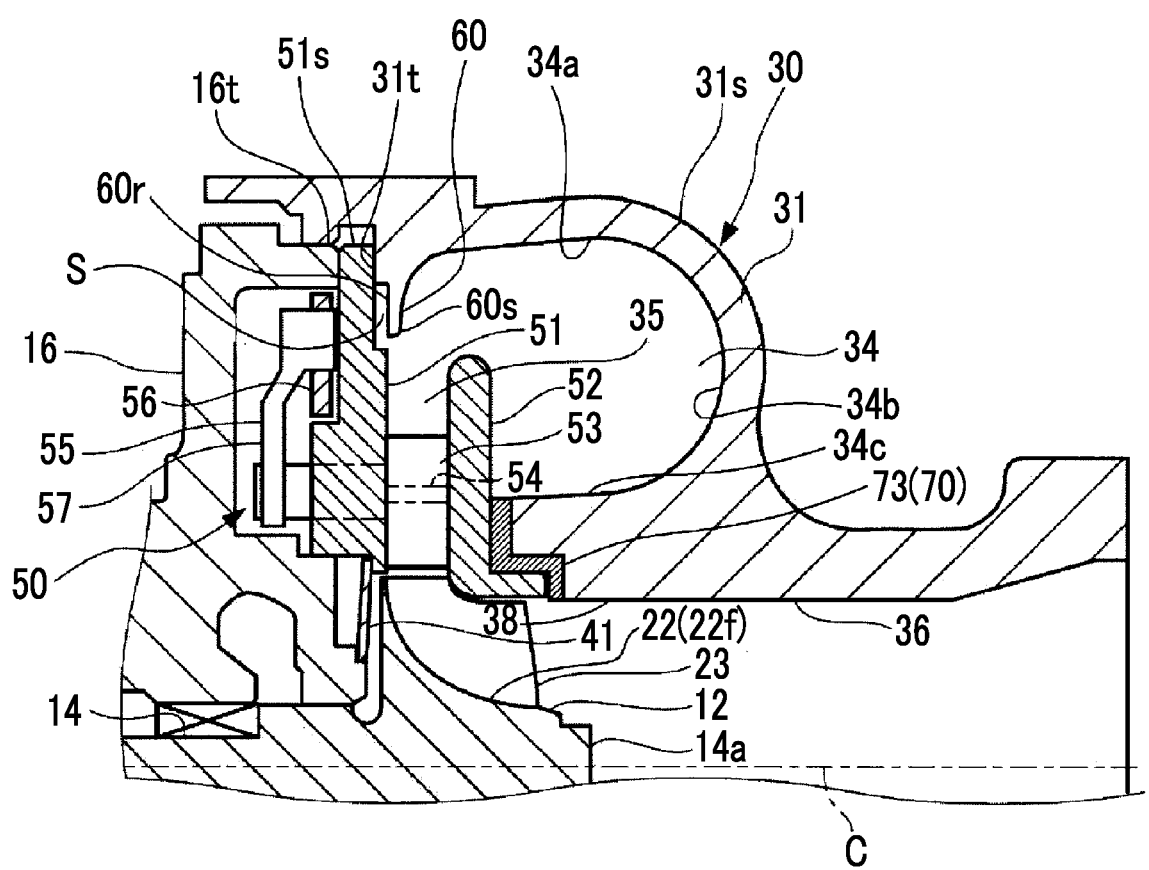
FIG. 5 is a cross-sectional view illustrating a modification example of a heat insulating portion of the turbocharger according to the embodiment of the present invention.

For example, a heat insulating material 73 may be sandwiched as the heat insulating portion 70 between the nozzle plate 52 and the shroud portion 38 as illustrated in FIG. 5.

As a result, the heat that is transferred to the nozzle plate 52 from the shroud portion 38 facing the scroll flowpath 34 can be reduced, and heat dissipation in the scroll flowpath 34 can be suppressed.

Figure 6:
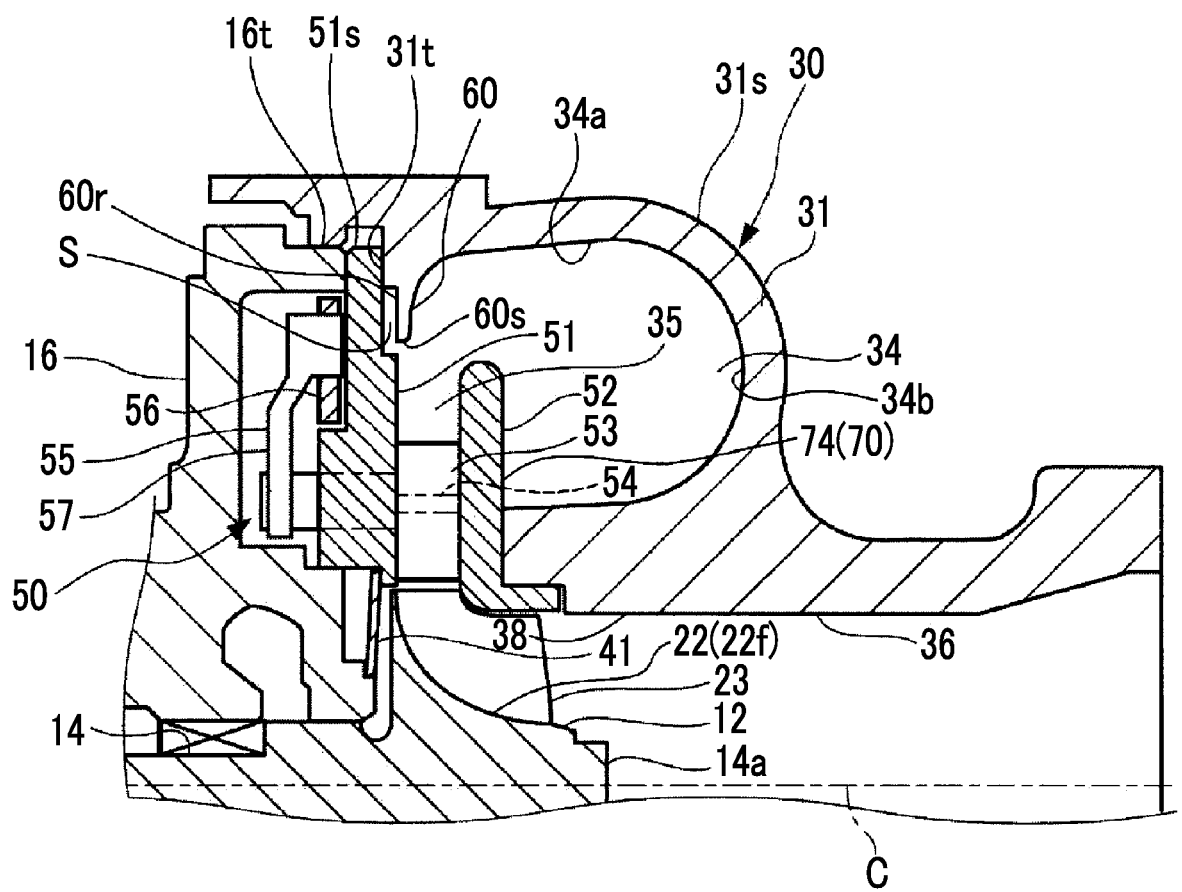
FIG. 6 is a cross-sectional view illustrating another modification example of the heat insulating portion of the turbocharger according to the embodiment of the present invention.

In addition, as illustrated in FIG. 6, a coating layer 74 formed of a heat insulating material such as a ceramics material that has heat insulating performance may be formed as the heat insulating portion 70 on the surface of the nozzle plate 52.

As a result, the heat that is transferred to the nozzle plate 52 from the shroud portion 38 facing the scroll flowpath 34 can be reduced, and heat dissipation in the scroll flowpath 34 can be suppressed. The coating layer 74 may be locally disposed at the part where the nozzle plate 52 and the shroud portion 38 are in contact with each other rather than on the entire surface of the nozzle plate 52.

Other Embodiments

The present invention is not limited to the above-described embodiment, and any change in design is possible within the scope of the present invention.

For example, being provided with all of the heat insulating portion 70, the cover portion 60, and the shape the scroll flowpath 34, in which the cross-sectional area of the flowpath gradually decreases with the inner circumferential inside wall surface 34c gradually displaced radially outwards along the gas flow direction as described above, is not essential and being provided with at least one of the heat insulating portion 70, the cover portion 60, and the shape of the scroll flowpath 34 will suffice.

In addition, the configuration of each part of the turbocharger 10 such as the turbocharger body 11, the compressor 17, and the turbine 30 is not limited to the above-described example and can be modified to another configuration.

INDUSTRIAL APPLICABILITY

The present invention can be applied to a turbocharger. According to the present invention, gas heat dissipation can be suppressed and turbocharging efficiency can be enhanced by the scroll flowpath being formed such that the inner circumferential inside wall surface is gradually displaced radially outwards along the gas flow direction and the cross-sectional area of the flowpath gradually decreases.

REFERENCE SIGNS LIST

10 Turbocharger
11 Turbocharger body
12 Turbine wheel
13 Compressor wheel
14 Rotating shaft
14a First end portion
14b Second end portion 15A, 15B Bearing
16 Bearing housing
16a Opening
16b Opening
16t Fixed portion
17 Compressor
18 Compressor housing
22 Disk
22f Disk surface
23 Blade
30 Turbine
31 Turbine housing
31s Scroll forming portion
31t Mount fixing portion
32 Gas introduction section
34 Scroll flowpath
34a Outer circumferential inside wall surface
34b Curved inside wall surface
34c Inner circumferential inside wall surface
35 Nozzle flowpath
36 Exhaust section
38 Shroud portion
38a End portion
41 Back plate
50 Variable vane mechanism
51 Nozzle mount
51s Outer circumferential end portion
52 Nozzle plate
53 Vane
54 Shaft
55 Drive unit
56 Drive ring
57 Link arm
60 Cover portion
60f Scroll side surface
60r Back surface
60s Tip portion
62 Recessed portion
70 Heat insulating portion
71 Gap
73 Heat insulating material
74 Coating layer
C Central axis (axis)
S Gap

The invention claimed is:

1. A turbocharger comprising:
a rotating shaft extending along an axis;
a turbine wheel disposed on a first end portion side of the rotating shaft;
a compressor wheel disposed on a second end portion side of the rotating shaft;
a turbine housing accommodating the turbine wheel;
a scroll flowpath formed in the turbine housing, continuing in a circumferential direction on a radially outer side of the turbine wheel, and guiding gas to the turbine wheel;
a nozzle flowpath guiding the gas radially inwards from the scroll flowpath and supplying the gas to the turbine wheel;
a vane disposed in the nozzle flowpath and adjusting an amount of the gas introduced in the nozzle flowpath;
a bearing housing rotatably supporting the rotating shaft; and
a nozzle mount disposed on a bearing housing side with respect to the nozzle flowpath and having an outer circumferential end portion sandwiched and held between the bearing housing and a mount fixing portion formed in the turbine housing, and directly supporting the vane,
wherein the scroll flowpath is formed such that an inner circumferential inside wall surface on a side close to the turbine wheel is gradually displaced radially outwards downstream in the circumferential direction in which the gas flows and the cross-sectional area of the flowpath gradually decreases and the scroll flowpath is formed such that an offset dimension of a cross-sectional center position of the scroll flowpath with respect to a radially outer position of the nozzle flowpath in a direction along the axis gradually decreases as the cross-sectional area of the flowpath gradually decreases along the flow direction of the gas, and
wherein the turbine housing includes a cover portion extending radially inwards from the mount fixing portion toward the nozzle flowpath and covering at least a part of the nozzle mount, and
wherein a space is formed between the cover portion and the nozzle mount.

2. The turbocharger according to claim 1, wherein the scroll flowpath is formed such that an outer circumferential wall surface on the radially outer side along the flow direction of the gas has a constant radial position with respect to the axis.

3. The turbocharger according to claim 1, further comprising:
an exhaust section formed in the turbine housing for the gas sent out by the turbine wheel; and
a heat insulating portion suppressing heat escape from the scroll flowpath to the exhaust section.

4. The turbocharger according to claim 3, wherein the heat insulating portion includes a gap formed in a shroud portion partitioning the scroll flowpath and the exhaust section from each other in the turbine housing.

5. The turbocharger according to claim 4, wherein the gap is filled with a heat insulating material.

6. The turbocharger according to claim 3, further comprising:
a nozzle plate disposed on a side opposite to the bearing housing with respect to the nozzle flowpath,
wherein the heat insulating portion includes a heat insulating material sandwiched between the nozzle plate and a shroud portion partitioning the exhaust section and the scroll flowpath from each other in the turbine housing.

7. The turbocharger according to claim 3, further comprising:
a nozzle plate disposed on a side opposite to the bearing housing with respect to the nozzle flowpath,
wherein the heat insulating portion includes a coating layer formed on a surface of the nozzle plate and including a heat insulating material.

8. The turbocharger according to claim 2, further comprising:
an exhaust section formed in the turbine housing for the gas sent out by the turbine wheel; and
a heat insulating portion suppressing heat escape from the scroll flowpath to the exhaust section.

* * * * *